March 13, 1928. Re. 16,900

J. G. DYBENS

CHECK VALVE UNIT FOR HYDRAULIC JACKS

Original Filed Dec. 22, 1924

Inventor:
John G. Dybens
By
Attorneys.

Reissued Mar. 13, 1928. Re. 16,900

UNITED STATES PATENT OFFICE.

JOHN G. DYBENS, OF LOS ANGELES, CALIFORNIA, ASSIGNOR, BY MESNE ASSIGNMENTS, TO HERMAN D. EBERLE.

CHECK-VALVE UNIT FOR HYDRAULIC JACKS.

Original No. 1,610,499, dated December 14, 1926, Serial No. 757,362, filed December 22, 1924. Application for reissue filed February 2, 1927. Serial No. 165,473.

The present invention pertains to improvements in hydraulic jacks, and is directed more particularly to the valve structure and its mode of assembly in the jack, whereby manufacturing costs are materially simplified, and replacement or repair of the valve mechanism is greatly facilitated.

Hydraulic jacks broadly comprise a reservoir chamber in which a non-compressible fluid, such as oil, is stored; a cylinder in which a piston is movable; a pump construction which is arranged to take oil from the reservoir and pump it into the cylinder below the piston, thus pressurally raising the piston in the cylinder; and a by-pass for allowing the oil in the cylinder to return to the reservoir, thus lowering the piston in the cylinder. A passage connecting between the oil reservoir and the pump has a check valve for preventing a reverse flow through this passage, that is, a flow of oil from the pump to the reservoir. A passage from the pump to the cylinder is provided with a check valve to prevent a reverse flow therethrough, that is, a flow of oil from the cylinder to the pump. These check valves are enclosed directly in a casting of the hydraulic jack, thus requiring considerable small machine work thereon. This tends to increase the cost of the jack and places the check valves in inaccessible positions so that the jack must be entirely disassembled to get at these valves in the case of repair or replacement.

It is therefore the primary object of the present invention to overcome the foregoing objections by the provision of a simple, inexpensive, and efficient valve unit, distinct from the pump cylinder, and adapted for assembly therewith in such manner that the unit may be readily removed for replacement, inspection, or repair, without the aid of tools or the necessity of dismantling the jack mechanism.

Incidental to the foregoing, a further object is to provide a distinct valve unit, assembled with the jack exteriorly of the oil chamber and retained in position by the pump cylinder, whereby the valve unit is rendered readily accessible and the manufacturing costs of the jack materially reduced.

A jack designed after my invention broadly comprises a reservoir chamber, a cylinder having a piston movably disposed therein, and a pump for pumping oil from the reservoir into the cylinder. In a base of the jack I provide a cavity in which I place the novel check valve unit of my invention. This check valve unit has an inlet passage which connects between an intake passage extending from the reservoir chamber and the barrel of the pump, and has an outlet passage which connects between the barrel of the pump and an exhaust passage connecting with the cylinder of the jack. I screw the barrel of the pump into the upper end of the cavity so that the lower end thereof engages the check valve unit and retains it securely in place. The check valve unit is situated in such a position that it is conveniently accessible and may be readily removed for inspection or repair. The check valve unit is of such a character that it may be very cheaply produced, owing to its size and the ease with which it may be handled for machining and assembling. By using a unit of this character, I eliminate much machine work on the base casting of the jack and in this manner I reduce the cost of the jack.

Other objects and advantages of the invention will be made evident hereinafter.

Referring to the drawings which are for illustrative purposes only,

Figure 1:
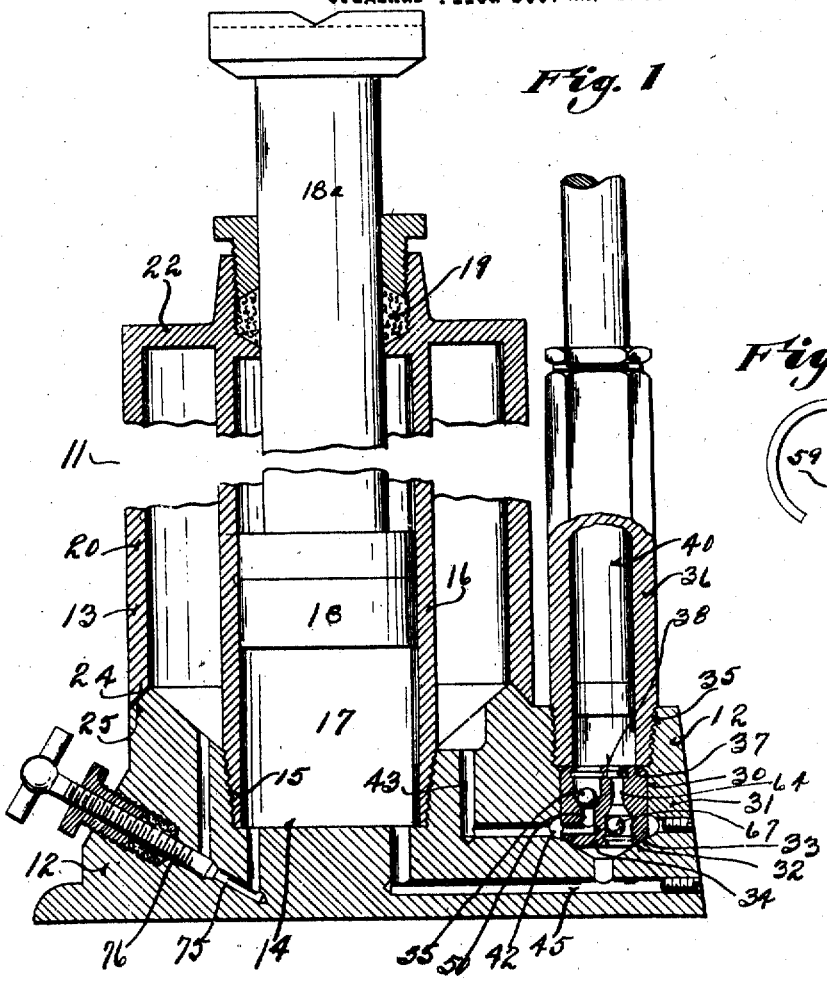
Figure 1 is a sectional view taken through a hydraulic jack employing the features of my invention.

In the form of my invention shown in the drawings, 11 represents a hydraulic jack having a base casting 12 and a head casting 13. The base casting 12 is provided with a central cavity 14 into which the lower end 15 of an inner cylinder wall 16 providing a cylinder chamber 17 is screwed. A piston 18 is movably arranged in the cylinder chamber 17 having a stem 18[a] extending upwardly therefrom through a stuffing box 19 of the head casting 13. An outer reservoir wall 20 is connected with the cylinder wall 16 by a top 22, this reservoir wall 20 providing a reservoir chamber 23. The lower face 24 of the reservoir wall 20 is beveled as shown, and engages with a beveled annular face 25 of the base casting 12, providing a fluid-tight joint between the base casting 12 and the head casting 13.

To one side of the base casting 12 as clearly shown in Fig. 1, is a cylindrical cavity 30 in which a check valve unit 31 having the features of my invention is installed. The lower portion of the cavity 30 provides a conical seat 32 and the lower beveled end 33 of the body 34 of the check valve unit 31 engages this conical seat 32. The upper part of the cavity 30 is threaded at 35, and a pump barrel 36 is screwed thereinto. The lower face 37 of the pump barrel 36 engages with the upper face 38 of the body 34, clamping the body securely against the conical seat 32, thus securing the check valve unit in place. A pump plunger 40 is reciprocable in the barrel 36, this plunger being reciprocated by mechanism not shown in the drawings. Adjacent to the lower portion of the cylindrical cavity 30 is an annular channel 42. An intake passage 43 is provided in the base casting 12, which intake passage 43 extends from the oil reservoir chamber 23 to the annular channel 42. An exhaust passage 45 is provided in the base casting 12, this exhaust passage 45 extending from the lower end of the cavity 30 to the lower portion of the cylinder chamber 17 as shown in Fig. 1 of the drawings.

Figure 4:
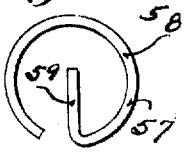
Figure 4 is an enlarged detail of a ball retainer used in the check valve unit construction.
Figure 2:
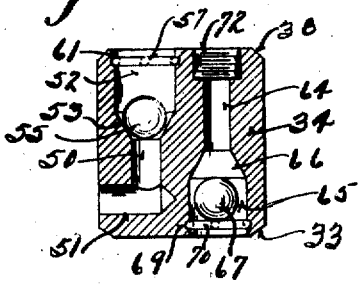
Figure 2 is an enlarged cross sectional view through a check valve unit having the features of my invention.
Figure 3:
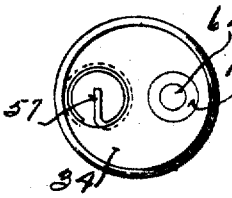
Figure 3 is a plan view of the check valve unit shown in Figure 2.

As clearly shown in Figs. 2 to 4, inclusive, the check valve unit has an inlet passage 50 which extends from the lower portion of the cylindrical face of the body 34 to the upper face 38 thereof. The portion 51 of the inlet passage 50 connects with the cylindrical face of the body 34 at such a place that it is in communication with the annular channel 42. The upper portion of the inlet passage 50 is enlarged so as to provide a ball chamber 52 and a seat 53. In the ball chamber 52 is a valve ball 55 which is arranged for engagement with the seat 53. The ball 55 is retained in the chamber 52 by means of a ball retainer 57 which is clearly shown in Fig. 4. This ball retainer 57 has an annular portion 58 and a radially extending leg 59. An annular recess 61 is provided in the upper end of the wall of the chamber 52 and in this recess 61 is placed the annular portion 58 of the retainer 57 so that the leg 59 extends toward the center of the chamber 52, thus preventing the ball 55 from removal from the chamber. Adjacent to the inlet passage 50 is an outlet passage 64 which extends substantially axially through the body 34, as shown. The lower portion of the outlet passage 64 is enlarged at the lower end so as to provide a ball chamber 65 and a ball seat 66. In the chamber 65 is a valve ball 67 which engages the ball seat 66. An annular recess 69 is provided at the lower end of the wall of the ball chamber 65 in which a ball retainer 70, identical with the ball retainer 57, is fitted. The upper end of the outlet passage 64 is enlarged and threaded as indicated at 72 in the drawings.

Again referring to Fig. 1, it is evident that the inlet passage 50 of the check valve unit 31 communicates between the annular channel 42 and the barrel 36, and that the outlet passage 64 connects between the barrel 36 and the exhaust passage 45. The valve ball 55 permits a flow of fluid from the annular channel 42 into the barrel 36 but prevents a reverse flow, that is, a flow from the barrel 36 to the annular channel 42. The ball 67 of the outlet passage 64 permits a flow of fluid from the chamber 65 into the exhaust passage 45 but prevents a flow of fluid from the exhaust passage 45 to the barrel 36.

When it is desired to raise the plunger 18 in the cylinder 17, the pump plunger 40 is reciprocated. During the upward stroke of the plunger 40, oil is drawn from the oil reservoir 23 through the intake passage 43 into the annular channel 42. The oil passes through the inlet 50, raising the ball 55 from its seat and into the space in the barrel 36 below the plunger 40. When the plunger is moved downward in the barrel 36, the ball 55 closes the inlet 50 so as to prevent a flow of oil from the barrel 36 through the inlet 50, and the oil will flow through the outlet 64, forcing the ball 67 from its seat, and will flow through the exhaust passage 45 into that portion of the cylinder chamber 17 below the piston 18. In this manner oil is pumped from the reservoir 23 into the cylinder chamber 17 below the piston 18, thus forcing the piston upward in the chamber 17. During the upward stroke of the plunger 40, the valve ball 67 closes the outlet 64 and prevents a reverse flow of oil from the chamber 17, and during the downward stroke of the plunger 40, the valve ball 55 closes the inlet 50 and prevents a reverse flow into the oil reservoir 23. A by-pass 75 is provided in the base casting 12 which connects between the lower end of the cylinder chamber 17 and the oil reservoir 23, as shown in Fig. 1. This by-pass 75 is ordinarily closed by a valve 76 and when it is desired to lower the plunger 18, this by-pass 75 is opened by manually unseating the valve 76, thus allowing the oil in the cylinder chamber 17 to flow through the by-pass 75 and into the oil reservoir 23.

From the foregoing description and drawings, the pronounced advantages of my invention are very evident. The machine work required on the base castings is reduced to a minimum by the elimination of check valve fittings therein. The performance of small machine work in inconvenient positions on large castings is a rather laborious task, and tends to increase the cost of such castings. By the employment of a check valve unit of my invention I am able to do all small machine work on the body 34, this body 34 being very convenient to handle and may be turned out very cheaply. The check valve unit 31 is conveniently retained in place by the pump 36, and, therefore, no extra retaining parts are required. The check valve unit is placed in such a position that it is accessible, and may readily be removed for inspection, replacement, or repairs. By providing the annular channel 42, it is not necessary to align the portion 51 of the inlet passage 50 of the unit 31 in any particular direction. Without provision of the channel 42, it would be necessary to accurately align the portion 51 with the intake passage 43 of the body 12. The feature of the channel 42 simplifies the installation of the check valve unit 31. The threaded portion 72 of the passages 64 is arranged to receive the threaded end of a removing member, thus facilitating the removing of the unit 31 from the cavity 30.

I claim:—

1. In a hydraulic jack, the combination of a head casting having a reservoir chamber and a cylinder, a base to which said head is secured, said base having a cavity, an intake passage connecting between said reservoir chamber and said cavity, and an exhaust passage connecting between said cylinder and said cavity, a pump barrel secured in said cavity, a plunger reciprocally disposed in said barrel, and a check valve unit in said cavity, said unit having an inlet passage connecting said intake passage with said barrel and an outlet passage connecting said exhaust passage and said barrel.

2. In a hydraulic jack, the combination of a head casting having a reservoir chamber and a cylinder, a base to which said head is secured, said base having a cavity, an intake passage connecting between said reservoir chamber and said cavity, and an exhaust passage connecting between said cylinder and said cavity; a pump barrel secured in said cavity; a plunger reciprocally disposed in said barrel; and a check valve unit secured in said cavity by said barrel, said unit having an inlet passage connecting said intake passage with said barrel and an outlet passage connecting said exhaust passage and said barrel.

3. A hyraulic jack as defined in claim 2 in which said cavity has a seat and said unit is retained against said seat by said barrel.

4. In a hydraulic jack, the combination of: a head casting having a reservoir chamber and a cylinder; a base to which said head is secured, said base having a cavity, an annular channel formed in the wall of said cavity, an intake passage connecting said reservoir to said annular channel, and an exhaust passage connecting between the bottom of said cavity and said cylinder; a pump barrel screwed into the upper part of said cavity; a pump plunger arranged in said barrel; and a check valve unit disposed in said cavity, said unit being engaged by the lower end of said barrel and being thereby retained in place, said unit having an inlet passage connecting between said annular channel and said barrel, a check valve in said passage allowing a flow of fluid from said annular channel into said barrel but preventing a flow from said barrel into said annular channel, an outlet passage connecting between said barrel and said exhaust passage, and a check valve in said passage, permitting a flow of fluid from said barrel into said exhaust passage but preventing a flow from said exhaust passage into said barrel.

5. In a hydraulic jack, the combination of: a base; a piston cylinder provided upon said base; a piston slidably disposed in said cylinder; means for forming a reservoir upon said jack, there being formed in said base a cavity, an intake passage communicating between said cavity and said reservoir, and an exhaust passage communicating between said cavity and said cylinder; a check valve unit disposed within said cavity; and a fluid forcing means secured upon said base so as to hold said unit in said cavity and communicate through said unit with said inlet and exhaust passages.

6. In a hydraulic jack, the combination of: a base; a piston cylinder provided upon said base; a piston slidably disposed in said cylinder; means for forming a reservoir upon said jack, there being formed in said base a cavity, an intake passage communicating between said cavity and said reservoir, and an exhaust passage communicating between said cavity and said cylinder; a check valve unit disposed within said cavity; and a fluid forcing means secured upon said base so as to hold said unit in said cavity and communicate through said unit with said inlet and exhaust passages, said check valve unit having a face which forms a fluid tight engagement with a surface of said cavity and a face which forms a fluid tight engagement with said fluid forcing means.

7. In a hydraulic jack, the combination of: a base; a piston cylinder provided upon said base; a piston slidably disposed in said cylinder; means for forming a reservoir upon said jack, there being formed in said base a cavity, an intake passage communicating between said cavity and said reservoir, and an exhaust passage communicating between said cavity and said cylinder; a check valve unit disposed within said cavity; and a fluid forcing means secured upon said base so as to hold said unit in said cavity and communicate through said unit with said inlet and exhaust passages, said check valve unit having a face which forms a fluid tight engagement with a surface of said cavity and a face which forms a fluid tight engagement with said fluid forcing means, said engagements being maintained by pressure of said fluid forcing means against said check valve unit.

8. In a hydraulic jack, the combination of: a base; a piston cylinder provided upon said base; a piston slidably disposed in said cylinder; means for forming a reservoir upon said jack, there being formed in said base a cavity, an intake passage communicating between said cavity and said reservoir, and an exhaust passage communicating between said cavity and said cylinder; a check valve unit disposed within said cavity; a pump barrel threadedly received into said cavity so as to hold said unit in said cavity and communicate through said unit with said inlet and exhaust passages; and a plunger slidably disposed in said barrel.

9. In a hydraulic jack, the combination of: a base; a piston cylinder provided upon said base; a piston slidably disposed in said cylinder; means for forming a reservoir upon said jack, there being formed in said base a cavity, an intake passage communicating between said cavity and said reservoir, and an exhaust passage communicating between said cavity and said cylinder; a check valve unit disposed within said cavity, said check valve unit having valved ducts therein which communicate with said intake and exhaust passages; a pump barrel threadedly received into said cavity so as to hold said unit in said cavity and communicate through said valved ducts with said intake and exhaust passages; and a plunger slidably disposed in said barrel.

10. In a hydraulic jack, the combination of a head having a reservoir chamber and cylinder, a base to which the head is secured, said base having an extension offset from the head and having therein an intake passage communicating with the reservoir chamber and an exhaust passage communicating with the cylinder, the termination of said passages forming mouths in the base extension in close proximity to each other, a pump barrel detachably secured to the base extension adjacent the mouths of the passages, a plunger reciprocatively disposed in the barrel, and a removable check valve unit fixed between the bottom of said pump barrel and the mouths of said passages, the check valve unit having an intake passage connecting the aforesaid intake passage and barrel, and an outlet passage connecting the aforesaid exhaust passage and said barrel, said check valve unit having oppositely opening check valves in the intake and outlet passages in said check valve unit.

In testimony whereof, I have hereunto set my hand at Los Angeles, California, this 25th day of January, 1927.

JOHN G. DYBENS.